United States Patent Office 3,773,731
Patented Nov. 20, 1973

3,773,731
METHOD OF HARDENING SYNTHETIC POLYMER WITH HETEROCYCLIC AZOLES
Reiichi Ohi, Takushi Miyazako, and Tadao Shishido, Kanagawa, Japan, assignors to Fuji Photo Film Co., Ltd., Kanagawa, Japan
No Drawing. Filed Dec. 28, 1971, Ser. No. 213,210
Claims priority, application Japan, Dec. 28, 1970, 46/120,541
Int. Cl. G03c 1/30; C08f 27/08
U.S. Cl. 260—79.5 NV            16 Claims

ABSTRACT OF THE DISCLOSURE

A method of hardening synthetic polymers containing primary amino groups by using a combination of at least one metal ion and at least one compound represented by the general Formula I

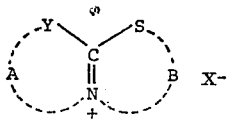

wherein A and B are non-metallic atoms necessary to form a heterocyclic ring, Y is sulfur or selenium and X is an anion.

BACKGROUND OF THE INVENTION

Field of the invention

This invention relates to a method for hardening synthetic polymers, and more particularly to a method for hardening synthetic polymers having primary amino groups wherein certain organic compounds and metal ions are employed in combination.

Description of the prior art

It is known in the art that synthetic polymers having primary amino groups are hardened by various organic compounds such as formalin or other aldehydes, chlorotriazines and mucochloric acid. In such cases, however, there have been drawbacks in that the hardening effect was too slow and the hardening agents themselves were unstable for storage. Therefore, it has been desired that new hardening agents eliminating such defects be developed.

SUMMARY OF THE INVENTION

Excellent hardening action on synthetic polymers having primary amino groups may be obtained by using, in the presence of metal ions, cyclic compounds containing therein the following linkages:

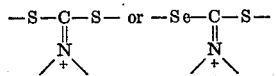

An object of the present invention is therefore to provide an advantageous method for hardening synthetic polymers having primary amino groups using the compounds containing the functional groups shown.

DETAILED DESCRIPTION OF THE INVENTION

The present invention provides a method for hardening synthetic polymers having primary amino groups wherein a compound or compounds represented by the following general Formula I

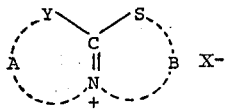

wherein A and B are the non-metallic atoms necessary to form a heterocyclic ring, Y is sulfur or selenium and X is an anion, is employed in combination with metal ions. The proportion of compounds could not be defined, since it may be varied over very wide ranges depending upon the specific compounds used. It may be defined by the term "effective amount."

Typical examples of compounds of the Formula I are illustrated in the following:

Compound 1

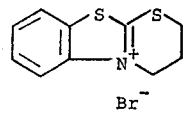

M.P. 288° C.

Compound 2

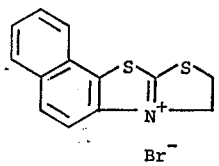

M.P. 258° C.

Compound 3

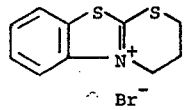

M.P. 260° C.

Compound 4

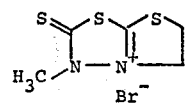

M.P. 267° C.

Compound 5

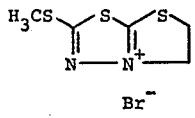

M.P. 275° C.

Compound 6

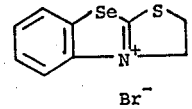

M.P. 288° C.

Compound 7

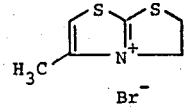

M.P. 235° C.

Compound 8

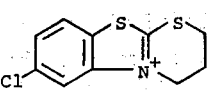

M.P. 291° C.

Compound 9

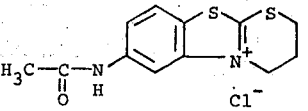

M.P. 305° C.

Compound 10

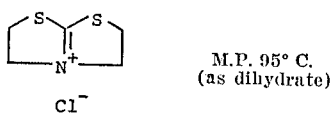

M.P. 95° C. (as dihydrate)

As also mentioned above, the compound must react with a primary amino group and from an —SH group which reacts with the metal ion. In this respect the compound having the linkages heretofore set out is suitable. These compounds are easily reacted with a primary amino group and cause ring-opening reaction to form —SH group.

As a subclass of heterocyclic nuclei it is limited that A and B are non-metallic atoms to form a 5-membered or 6-membered heterocyclic ring which may have further substituents including fusing rings.

The following are four specific compounds:

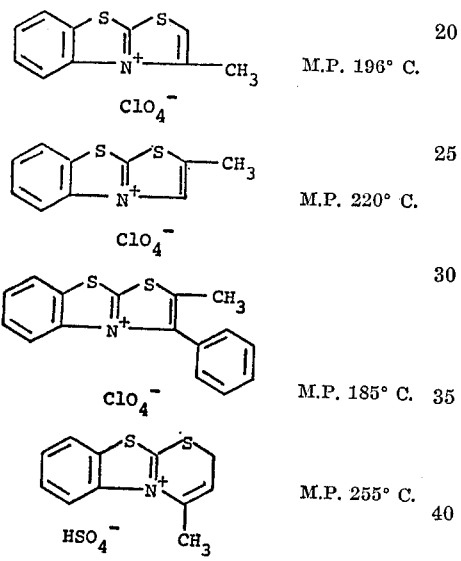

These four compounds may be prepared as described in Nippon Yakugaku Zasshi (Journal of the Pharmaceutical Society of Japan, vol. 89, pages 469–474 (1969)).

The compounds used in the present invention may, in general, be readily prepared by reacting, by heating to about 160° C., an azole compound having a methylmercapto group with ethylene bromide or 1,3-dibromopropane.

Synthesis 1 (Compound 1)

A mixture of 16 g. of 2-methylthiobenzothiazole and 20 g. of ethylene bromide was heated at 160° C. for 4 hours. The crystals formed upon cooling were collected by filtration and recrystallized from ethanol to obtain 17 g. of needle-like crystal having a melting point of 258° C.

Synthesis 2 (Compound 3)

A mixture of 16 g. of 2-methylthiobenzothiazole and 25 g. of 1,3-dibromopropane was heated at a temperature of 160° C. for 4 hours. After cooling, the precipitated crystals were filtered off and recrystallized from ethanol to obtain 14 g. of needle-like crystals having a melting point of 260° C.

Synthesis 3 (Compound 6)

A mixture of 20 g. of 2-methylthiobenzoselenazole and 20 g. of ethylene bromide was heated at a temperature of 160° C. for 4 hours. After cooling, the precipitated crystals were collected by filtration to obtain 18 g. of needle-like crystal having a melting point of 288° C.

Compounds 8 and 9 may be prepared as described in Chemical Abstracts, vol. 72, page 31, 666 (1970), and Compound 10 as described in Chemical Abstracts, vol. 63, page 11, 569 (1965).

The reaction between the polymer, the compound and the metal ion is considered as follows:

A primary amino group of the polymer reacts with the compound and bonds to a carbon atom which is attached to —S and —Y to form a Schiff base and simultaneously ring B is opened to form —SH group (ring A is usually maintained). Then two —SH groups thus formed are bonded through the metal ion by forming a complex. Thus a cross-linking reaction is completed.

Model:

Polymer—Compound—Metal ion—Compound—Polymer

The minimum number of primary amino groups in the polymer is 2. Preferable amount may be more than 2 per 1000 of recurring units of the polymer, with no restriction as to the position of the primary amino group in the polymer. The polymer being water soluble is preferable.

As mentioned above, theoretical amount would be 1 atom per 1 mole of the polymer. Suitably more than 0.2 part by weight, preferably more than 2 parts of the compound per 1000 parts of polymer. Suitably more than 0.002 part, preferably more than 0.01 part of the metal per 1000 parts of the compound.

The synthetic polymers containing primary amino groups include those derived from the polymerization of monomers containing amino groups, examples of which are as follows: aminoethyl vinyl ether (Liebigs Annalen der Chemie, 601, 81 (1956)); aminostyrene (Chemical Abstracts 34, 389, (1940)); paraaminophenyl vinyl ether (Chemical Abstracts 56, 12, 781 (1962)); or vinylbenzylamine (Berichte der Deutschen Chemischen Gesellschaft, 56, 2154 (1923)). The synthetic polymers may also be copolymers containing these monomers. The necessary ratio of monomer with primary amino groups is set out above. Preferable examples of comonomer are acrylamide, N-substituted acrylamides, methacrylamide, N-substituted acrylamides, vinyl pyrrolidone, etc.

There may also be used polymers derived from macromolecular reactions, such as those synthesized by the reaction between polymethyl acrylate and diamines (see Die Makromolekular Chemie, 22, 31 (1957)) or those synthesized by the reduction of polyacrylamide with lithium aluminum hydride (see The Journal of Organic Chemistry, 26, 1274 (1961)).

The synthetic polymers also include polymers of primary amines, for example, polyvinylamine and polylysine.

Examples of the polymers containing primary amino groups will be illustrated in the following:

|  | 11 | 12 | 13 | 14 | 15 | 16 | 17 |
|---|---|---|---|---|---|---|---|
| —CH$_2$—CH— <br>         $\mid$ <br>      CONH$_2$ |  |  |  |  |  |  |  |
| Mol percent | 70 | 90 | 80 | 95 | 90 | 80 | 98 |
| —CH$_2$—CH— <br>         $\mid$ <br>      COOCH$_3$ |  |  |  |  |  |  |  |
| Mol percent | 27 | 8 | 18 | 4 | 9 | 19 |  |
| —CH$_2$—CH— <br>         $\mid$ <br>      CONH(CH$_2$)$_n$NH$_2$ |  |  |  |  |  |  |  |
| Mol percent | 3 | 2 | 2 | 1 | 1 | 1 |  |
| —CH$_2$—CH— <br>         $\mid$ <br>      CH$_2$NH$_2$ |  |  |  |  |  |  |  |
| Mol percent |  |  |  |  |  |  | 2 |
| n |  | 3 | 3 | 3 | 3 | 2 | 2 |
| $[\eta]^{30}_{1\% NaCl}$ | 2.60 | 1.85 | 1.88 | 1.83 | 1.54 | 1.62 | 3.07 |

In the following, some examples of the synthesis of these polymers which contain primary amino groups will be illustrated. The terminal groups of the polymer are not substantial in our invention.

Synthesis 4 (Compound 11)

76 g. of methyl acrylate (30 mol percent)-acrylamide (70 mol percent) copolymer was dissolved in 2 liters of water and 25 g. of 1,3-propanediamine was added with stirring. The temperature of the whole system was kept at 40–50° C. for a period of 4 hours. The resulting aqueous solution of a polymer containing primary amino groups was dialyzed overnight against distilled water and then freeze-dried. Titration with 0.05 N HCl solution indicated that the resulting polymer contains 3 mol percent of amino groups. The intrinsic viscosity of the polymer was $$[\eta]^{30}_{1\% NaCl} \ 2.60$$

Compounds 12 to 16 may also be prepared in substantially the same manner. The copolymers 12 to 16 are prepared repeating the method of Synthesis 4 except the starting copolymers and the reaction conditions shown in the following table.

|  | 12 | 13 | 14 | 15 | 16 |
|---|---|---|---|---|---|
| Starting copolymer composition: | | | | | |
| Acrylamide | 90 | 80 | 95 | 90 | 80 |
| Methyl acrylate | 10 | 20 | 5 | 10 | 20 |
| Reaction time (hours) | 4 | 4 | 3 | 3 | 3 |
| Reaction temperature (° C.) | 40–50 | 40–50 | 30–40 | 30–40 | 30–40 |

Synthesis 5 (Compound 17) (0.2 mol)

14.2 g. of polyacrylamide (molecular weight 100,000) was powdered and dispersed in 1 liter of dioxane, whereafter 4 g. of lithium aluminum hydride was added thereto. The mixture was heated to around the reflux temperature of the dioxane (ca. 100° C.) and stirred for 6 hours. Subsequently, a 5% aqueous hydrochloric acid solution was slowly added to inactivate the unreacted lithium aluminum hydride. HCl was added so as to become pH 2 of the solution. The dioxane was then removed until the reaction products precipitated as solids, and a 5% aqueous caustic soda solution (100 ml.) was added to the residue, thus giving a homogeneous aqueous solution of the polymer. The aqueous solution was poured into a bag formed of cellophane membrane and dialyzed overnight against distilled water followed by freeze-drying. Yield 13.0 g. Intrinsic viscosity $$[\eta]^{30}_{1\% NaCl} \ 3.07$$

Titration using a 0.05 N hydrochloric acid solution indicated that the resulting polymer contained 2 mol percent of amino group.

The compounds of the general Formula I show a stronger hardening activity when used in an alkaline atmosphere, which condition the synthetic polymers will generally satisfy due to their own amino groups, thus, in such cases, obviating the need to add alkalis. Alkaline condition means pH greater than 7, preferable pH is greater than 8.

The method of the invention for hardening the synthetic polymers having primary amino groups may be used in various manners. For example, by utilizing the hardening method of the present invention, it is possible to remarkably improve the properties of a skin or coating of the above-described polymers. Furthermore, by applying the hardening method of the invention to the photographic arts, it is possible to obtain a polymer image corresponding to the photographic image, which polymer image finds use in printing negatives. For example, a water-soluble synthetic polymer containing primary amino groups and an organic compound according to the present invention are coated on a suitable support and the coated surface of the support is then surface contacted with an exposed photographic silver halide light-sensitive material, followed by processing with a developing composition for use in diffusion transfer processes, whereby the silver halide in the unexposed area will be dissolved in a silver halide solvent contained in the developing composition and diffused in the direction of the polymer layer, thereby causing an interaction between the silver ions and the organic compound of the invention. As a result, the polymer in the area is hardened and rendered substantially insoluble in water, while the polymer layer corresponding to the exposed area remains unhardened due to no diffusion thereto of any silver ion. Subsequently, the polymer element is washed with water to obtain a polymer relief corresponding to the negative images.

According to the present invention, only a trace amount of metal ion is sufficiently effective and the amount thereof has no restrictions unless the solubility of the metal ions is exceeded. Optimum amounts to be added may be readily determined by means of a simple preliminary test, e.g., preparing various concentrations of aqueous solutions of metal ions, adding each of the metal ion solutions into an aqueous solution containing the specific amounts of the polymer and of the compound, determining the viscosity of each solution. Metals such as cobalt, cadmium, nickel, silver, zinc, copper and manganese provide a particularly preferred effect. As mentioned above, the metal ion must form a complex with the —SH group (this is the general characteristic). Sub-groups are ions of metals belonging to groups 6A, 7A, 8, 1B or 2B of the periodic table (periodic table attached "Kinzoku" (Metal), vol. 28, No. 1 (1958)).

The present invention will now be further explained in detail with reference to the following examples using some of the typical compounds of the invention.

EXAMPLE 1

To 20 ml. of a 0.3% aqueous synthetic polymer solution, as shown in Table 1, was added 5 ml. of a 0.02 molar aqueous Compound 1 solution. After the subsequent addition of 5 ml. of 0.01 N silver nitrate, the viscosity at 30° C. was measured to obtain the results summarized in Table 1, where the relative viscosity $\eta_r$ is the value obtained when the viscosity of the aqueous solution prepared by adding 5 ml. of 0.01 N silver nitrate and 5 ml. of water into 20 ml. of the 0.3% aqueous synthetic polymer solution is 1.

TABLE 1

| Synthetic polymer: | $\eta_r$ |
|---|---|
| 11 | 3.7 |
| 12 | 3.9 |
| 13 | 2.2 |
| 15 | 2.0 |
| 16 | 2.8 |
| 17 | 3.8 |

EXAMPLE 2

To 20 ml. of a 0.3% aqueous synthetic polymer solution 11 was added 5 ml. of a 0.02 molar aqueous solution of the compound shown in Table 2. 5 ml. of a 0.01 N silver nitrate solution was then added, whereafter the viscosity at 30° C. was measured to obtain the results shown in Table 2, where the relative viscosity is the value obtained when the viscosity of the solution prepared by adding to 20 ml. of the 0.3% synthetic polymer 11 solution to 5 ml. of 0.01 N aqueous silver nitrate solution and 5 ml. of water is 1.

TABLE 2

| Compound: | $\eta_r$ |
|---|---|
| 1 | 3.7 |
| 2 | 8.2 |
| 6 | 2.5 |
| 7 | 2.5 |
| 10 | 3.0 |

EXAMPLE 3

To 20 ml. of a 1% aqueous synthetic polymer 11 solution (pH 8.5) was added 5 ml. of a 0.02 molar Compound 1 solution. 5 ml. of a 1 molar solution of the inorganic compound as indicated in Table 3 was then added and changes in the resulting solution observed, thereby obtaining the results tabulated in Table 3. When no Compound 1 was added, no changes in the aqueous polymer solution were observed.

TABLE 3

| Inorganic compound: | Changes in aqueous synthetic polymer solution |
|---|---|
| CoCl$_2$·6H$_2$O | Gelled. |
| NiSO$_4$·7H$_2$O | Do. |
| CdSO$_4$ | Do. |
| CuCl$_2$·2H$_2$O | Do. |
| MnSO$_4$·6H$_2$O | Increased in viscosity. |
| ZnSO$_4$·7H$_2$O | Do. |

What is claimed is:

1. A method of hardening synthetic polymers containing primary amino groups comprising using as a hardening agent, in combination, an effective amount of at least one metal ion selected from the group consisting of ions of metals of Groups 6–A, 7–A, 8, 1–B and 2–B of the Periodic Table and at least one compound represented by the general formula

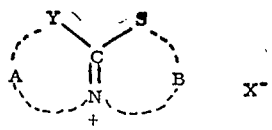

wherein A and B are the non-metallic atoms necessary to form a 5- or 6-membered heterocyclic ring wherein said ring may have at least one carbocyclic ring fused thereto, Y is selected from the group consisting of sulfur and selenium and X represents an anion, said compound being capable of reacting with said primary amino group to form a —SH group which in turn reacts with said metal ion to harden said polymer.

2. The method as claimed in claim 1 wherein said metal ion is selected from the group consisting of cobalt, cadmium, nickel, silver, zinc, and manganese ions.

3. The method as claimed in claim 1 wherein said compound is of the formula:

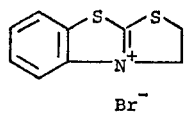

4. The method of claimed in claim 1 wherein said compound is of the formula:

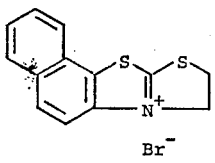

5. The method as claimed in claim 1 wherein said compound is of the formula:

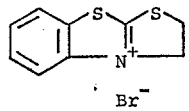

6. The method as claimed in claim 1 wherein said compound is of the formula:

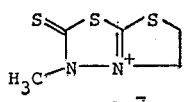

7. The method as claimed in claim 1 wherein said compound is of the formula:

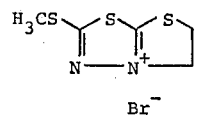

8. The method as claimed in claim 1 wherein said compound is of the formula:

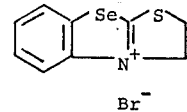

9. The method as claimed in claim 1 wherein said compound is of the formula:

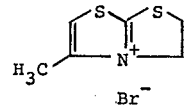

10. The method as claimed in claim 1 wherein said compound is of the formula:

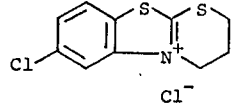

11. The method as claimed in claim 1 wherein said compound is of the formula:

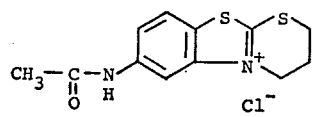

12. The method as claimed in claim 1 wherein said compound is of the formula:

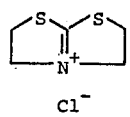

13. The method as claimed in claim 1 wherein A represents the non-metallic atoms necessary to form a thiazole, selenezole, thiadiazole, thiadiazoline or thiazoline heterocyclic ring which may have at least one carbocyclic ring fused thereto and which may be substituted.

14. The method as claimed in claim 13 wherein said heterocyclic ring contains a substituent selected from the group consisting of a sulfur atom, a methyl group, a halogen atom, a carboxymethylamino group or a thiomethyl group.

15. The method as claimed in claim 1 wherein B represents the non-metallic atoms necessary to form a thiazoline, thiazole or thiazine heterocyclic ring which may be substituted.

16. The method as claimed in claim 15 wherein said heterocyclic ring contains a substituent selected from the group consisting of a methyl group or a phenyl group.

References Cited

J. Pharmaceutical Soc. of Japan, 89, pp. 469–474 (1969) [Nippon Yakugaku Zasshi, 89].

JOSEPH L. SCHOFER, Primary Examiner

C. A. HENDERSON, Jr., Assistant Examiner

U.S. Cl. X.R.

96—111; 260—79.5 R, 80.3 N, 89.7 S, 302 F, 302 D, 304, 306.7